Patented Oct. 4, 1938

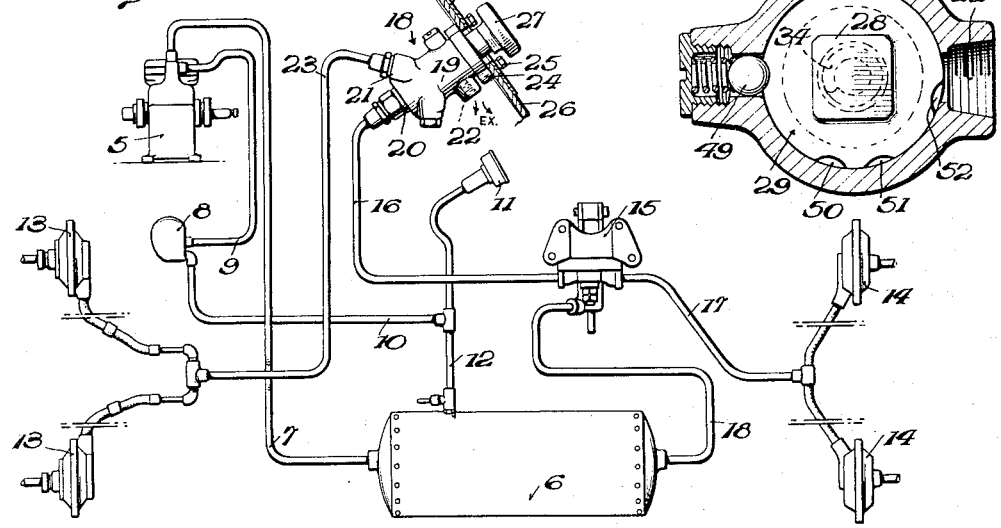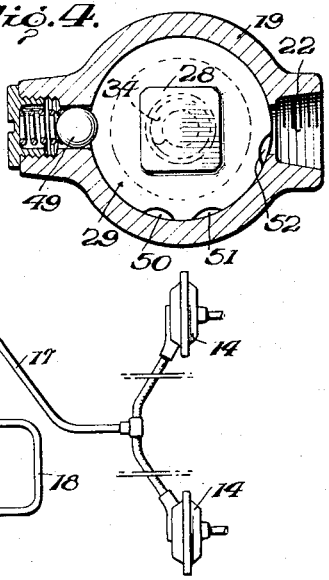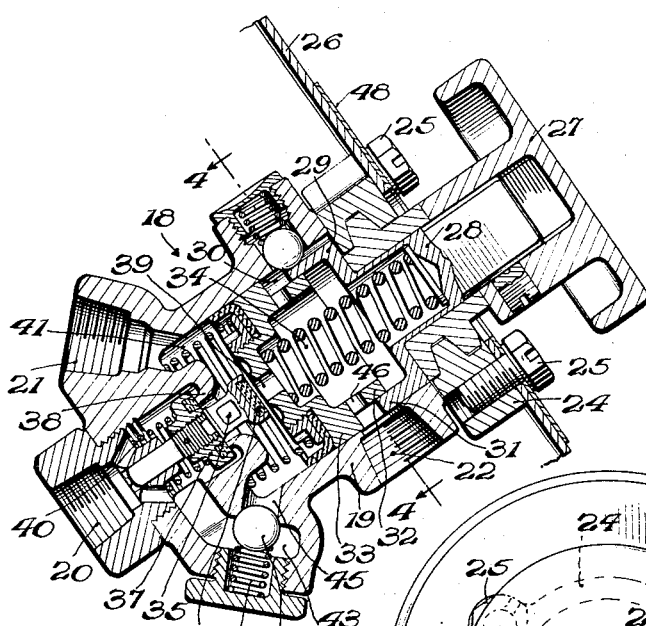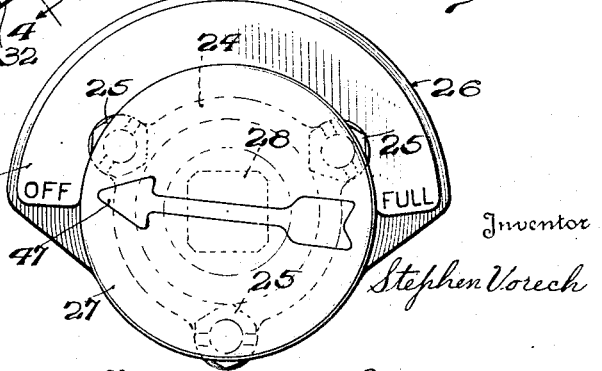

2,132,090

UNITED STATES PATENT OFFICE 2,132,090

BRAKE MECHANISM

Stephen Vorech, Pittsburgh, Pa., assignor to Bendix-Westinghouse Automotive Air Brake Company, Pittsburgh, Pa., a corporation of Delaware Application May 31, 1935, Serial No. 24,442

7 Claims. (Cl. 188—152)

This invention relates to fluid pressure braking systems and more particularly to a system of this character especially adapted for use in connection with automotive vehicles.

One of the objects of the present invention is to provide a motor vehicle fluid pressure braking system so constituted that the fluid pressure admitted to certain of the vehicle braking chambers may be readily controlled by an operator in order that the braking pressures may be limited when desired, as for example when traveling over wet or icy pavements.

Another object of the invention is to provide, in a device of the above character, a controllable device readily accessible to the operator and settable to obtain any predetermined limit of braking pressure in certain of the vehicle braking chambers independently of the usual brake valve.

Still another object is to provide, in a pressure-limiting device especially adapted for use in connection with fluid braking systems of the type having a brake valve to control the flow of fluid pressure to the various brake chambers, a novel construction for quickly and effectively enabling exhausting of the brake chambers controlled by said valve device, as soon as the brake valve is moved to the release or exhaust position.

Still another object is to provide a pressure-limiting valve device associated with the front brake chambers of a fluid pressure braking system which provides an arrangement whereby the maximum available pressure on the front brake chambers is positively limited irrespective of the pressure applied to the rear brake chambers.

Still another object is to provide a novel pressure-limiting valve operable by fluid pressure and including a novel and compact arrangement of parts so constructed and arranged as to be readily adjustable by an operator in order to variably positively limit the passage of fluid pressure therethrough.

Other objects and novel features of the invention will appear more fully hereinafter from the following description when taken in connection with the accompanying drawing illustrating a preferred embodiment of the invention. It is to be expressly understood, however, that the drawing is utilized for purposes of illustration only and is not designed as a definition of the limits of the invention, reference being had for this purpose to the appended claims.

In the drawing, wherein similar reference characters refer to similar parts throughout the several views:

Fig. 1 is a diagrammatic view of a fluid pressure motor vehicle braking system embodying the present invention;

Fig. 2 is an axial sectional view through the pressure-limiting valve shown in Fig. 1;

Fig. 3 is a face view of the valve-adjusting member and scale cooperating therewith, and Fig. 4 is a sectional view taken along line 4—4 of Fig. 2.

Referring more particularly to Fig. 1 of the drawing, the present invention is illustrated therein as being embodied in a vehicle fluid pressure braking system of the type comprising a compressor 5 adapted to supply fluid pressure to a reservoir 6 through a conduit connection 7, the compressor being provided with a governor 8 of a well known type and connected thereto by means of conduit 9. As is usual in arrangements of this type, the governor is connected to the reservoir 6 by a conduit 10, while a gauge 11 is associated with the reservoir through a conduit 12. Front and rear braking chambers 13 and 14 respectively are adapted to be supplied with fluid pressure from the reservoir 6 by means of a brake valve 15, the latter being connected to the front brake chambers as by means of conduit 16 and to the rear brake chambers through conduit 17, a connection 18 being adapted to convey fluid pressure from the reservoir to the brake valve. With such an arrangement, it will be understood by those skilled in the art that application of the brake valve 15 will simultaneously control the flow of fluid pressure to the front and rear brake chambers 13 and 14 in order to apply the front and rear brakes of the vehicle.

In installations of the above referred to character, it has been determined that where equal pressures are applied to the front and rear brake chambers, the vehicle has a tendency to skid on wet or icy pavements and especially is this tendency noticeable where an attempt is made to steer the vehicle with a partial application of the brakes. In order to overcome such tendencies, the present invention provides a readily-controllable connection between the brake valve and the front brake chambers for positively limiting the pressure supplied to the latter.

Referring to Figs. 1 and 2 of the drawing, such pressure-limiting device is constituted by a valve structure 18 and comprises more particularly a casing 19 provided with inlet, outlet and exhaust openings 20, 21 and 22 respectively. The inlet opening 20 is adapted to communicate with the conduit connection 16, while the outlet opening 21 connects directly with the front brake chambers 13 through conduit 23. The exhaust opening 22 communicates directly with atmosphere at all times.

The valve casing 19 is suitably secured to an interiorly-threaded ring 24, which latter is attached, as by means of screws 25, to the vehicle dash 26 in order that the valve structure may be readily accessible to the vehicle operator, and as shown, an adjustable controlling member 27 is threadedly received by the ring 24 for a purpose which will appear more fully hereinafter. Preferably, the adjustable member 27 is interiorly recessed and is adapted to receive the rectangularly-shaped reduced end portion 28 of a guide member 29, the latter being rotatably and slidably mounted within a central bore 30 of the casing 19. As shown, the guide member 29 is provided with a depending skirt 31 adapted to receive and guide a corresponding skirt 32 formed integrally with a valve-actuating piston member 33. A graduating spring 34 is confined between the piston 33 and the end portion 28 of the guide member, and from this construction, it will be observed that rotation of the adjustable member 27 will advance the latter into the bore 30, thus serving to vary the tension of said spring and determining the initial position of the piston 33 within the bore 30.

A suitable valve element 35 is housed within the casing 19 for the purpose of controlling the flow of fluid pressure from the inlet 20 to the outlet 21 and, as shown, such valve element includes exhaust and intake portions 36 and 37 respectively, the latter cooperating with a seat 38 formed integrally with the casing, while the exhaust valve portion is adapted to be contacted by the piston 33, an exhaust port 39 in said piston being closed when such contact is effected. In the position of the parts shown in Fig. 2, the valve element 35 has been moved to closed position by resilient means 40 and the space between the exhaust valve portion 36 and the piston 33 which may be termed an outlet chamber 41 is disconnected from the fluid pressure conduit 16. However, in the event that the member 27 is threadedly adjusted into the ring 24, it will be understood that spring 34 is tensioned and will move the piston 33 downwardly to contact and move the valve element 35 to such a position as to effect an opening of the intake portion 37 and thus establish communication between the front brake chambers and the fluid pressure conduit 16. As well understood by those skilled in the art, and bearing in mind that the piston 33 is subjected to the fluid pressure conveyed to the front brake chambers, when such fluid pressure within the outlet chamber 41 is sufficient to overcome the initial adjustment of the spring 34, the said piston will be moved upwardly until the intake portion 37 of the valve element 35 seats on 38 thus arresting any further flow of fluid pressure to the front brake chambers. Thus the fluid pressure available for front wheel braking will be limited depending upon the position to which the member 27 is adjusted.

From the above construction, it will be observed that when the brake valve 15 is moved to exhaust position and the pressure in conduit 16 and beneath the intake portion 37 of the valve element is reduced, the exhausting of fluid pressure from the front brake chambers past the valve element 35 to the brake valve will be restricted and consequently there may be a lag in the release of the front brakes. This is due to the fact that the intake valve portion 37 opens slowly as pressure is reduced in conduit 16, it being recalled that valve 35 is of the self-lapping type. In order to secure quick release of the fluid pressure in the front brake chambers, there is provided a check valve 42 positioned in a chamber 43 in the casing and resiliently urged as by means of spring 44, during normal operation, to the position shown, wherein a by-pass conduit 45 connecting the outlet chamber 41 and the intake 20 is closed. The check valve is so constructed as to prevent flow of pressure fluid from the inlet 20 to the outlet chamber 41 via the by-pass 45, quickly opening, however, to permit passage of fluid from the outlet chamber to the inlet upon a reduction of pressure in the latter. Thus when the brake valve 15 is moved to exhaust position, the fluid pressure in the front brake chambers will be readily by-passed around the valve element 35 by the opening of the check valve 42 in order to permit rapid release of the front brakes.

In the event that any leakage occurs from the inlet 20 to the outlet chamber 41 via the check valve 42 or the closed intake portion 37 of valve element 35, when the brakes are applied, which would increase the pressure in the front brake chambers 13 to full reservoir pressure, the exhaust port 39 is provided in the piston 33 which is adapted to connect the outlet chamber 41 directly to the atmospheric opening 22 through an exhaust port 46 formed in the skirt 32 of the piston. Thus should there be any tendency for the pressure in the outlet chamber 41 to rise beyond that for which the adjusting member 27 is set, such increased pressure will move piston 33 away from the exhaust portion 36 of valve element 35 to connect said chamber directly with atmosphere until the proper pressure differential between the spring 34 and chamber 41 has been reestablished. The construction thus provides a positively acting arrangement whereby the outlet pressure and hence the pressure of the fluid supplied to the front brake chambers may be readily and positively maintained at a predetermined value within the range of adjustment of the member 27.

Referring more particularly to Fig. 3, the member 27 is provided with an indicator 47 cooperable with a suitable scale 48, and in the position of the parts shown, Figs. 2 and 3, the valve structure 18 is so adjusted as to prevent any pressure from being admitted to the front brake chambers. Adjustment of the member 27, however, in a clockwise direction, as viewed in Fig. 3, will tension the spring 34 and effect an opening of the valve element 37 in order to secure various increased fluid pressure differentials from zero to a maximum. With such an arrangement, therefore, an operator may control the available pressure in the front brakes throughout a wide range to the end that most satisfactory braking of the vehicle may be accomplished for variable road conditions.

In order to releasably maintain the adjusting member 27 in any one of its adjusted positions, a suitable detent device 49, Figs. 2 and 4, is provided for cooperation with suitable notches 50, 51 and 52 provided in the periphery of the guide member 29. Thus upon rotation of the member 27 and guide member 29, the latter may be resiliently maintained in any desired position of adjustment for securing a predetermined braking pressure in the front brake chambers.

It will be understood from the foregoing description that valve portion 36 of valve 35 constitutes a relief valve in its operation with port 39. Valve portion 37 of the valve 35 serves the combined functions of controlling the flow of fluid pressure to and from the front brake chambers.

While one embodiment of the invention has been shown and described herein, it will be understood by those skilled in the art that the invention is not limited thereto but may be embodied in various forms. Reference will, therefore, be had to the appended claims for a definition of the limits of the invention.

What is claimed is:

1. In a pressure-limiting valve device having a casing provided with inlet, outlet and exhaust openings, an adjusting cap adjustably threadedly received in the casing, a guide slidably positioned in the casing and having a recessed extension received within said cap, said guide abutting one end of said cap, a valve-biasing piston within the casing and having a skirt provided with exhaust portions communicating with said exhaust opening, said skirt having sliding movement within said guide, and resilient means confined within said casing between said extension and said piston and adjustable as to tension by adjusting said cap relative to said casing.

2. In a pressure-limiting valve device having a casing provided with inlet, outlet and exhaust openings, a valve-biasing piston in said casing dividing the latter into an exhaust chamber and an outlet chamber, valve means for controlling the flow of fluid pressure from said inlet to said outlet chamber, the latter chamber having unrestricted communication with said outlet, and by-pass means formed in said casing for by-passing fluid pressure from said outlet chamber to said inlet upon a reduction in pressure at said inlet, said by-pass means including a check valve permitting fluid pressure flow from said outlet chamber to said inlet only.

3. In a pressure-limiting valve device for fluid pressure braking systems, the combination with a casing provided with inlet, outlet and exhaust openings, of a valve-biasing piston in said casing dividing the latter into an exhaust chamber and an outlet chamber, said piston being formed with a centrally-located exhaust port, valve means for controlling the flow of fluid pressure from said inlet to said outlet chamber, the latter chamber communicating with said outlet, manually-operable means for moving said piston into engagement with said valve means to close off the exhaust port and to move the valve means to operative position, whereby communication is established between the inlet and the outlet chamber for the passage of fluid pressure, and by-pass means formed in said casing for by-passing fluid pressure from the outlet chamber to the inlet upon a reduction in pressure at said inlet.

4. In a pressure-limiting valve device for fluid pressure braking systems, the combination with a casing provided with inlet, outlet and exhaust openings, of a valve-biasing piston in said casing dividing the latter into an exhaust chamber and an outlet chamber, said piston being formed with a centrally-located exhaust port, valve means for controlling the flow of fluid pressure from said inlet to said outlet chamber, the latter chamber communicating with said outlet, resilient means bearing against one side of said piston, manually-operable means for variably compressing said resilient means to vary the pressure of the fluid conducted to said outlet chamber, said resilient means when compressed serving to move said piston into engagement with said valve means to close off the exhaust port and to move the valve means to operative position, whereby communication is established between the inlet and the outlet chamber for the passage of fluid pressure, and by-pass means formed in said casing for by-passing fluid pressure from the outlet chamber to the inlet upon a reduction in pressure at said inlet.

5. In a pressure-limiting valve device for fluid pressure braking systems, the combination with a casing provided with inlet, outlet and exhaust openings, of a valve-biasing piston in said casing dividing the latter into an exhaust chamber and an outlet chamber, said piston being formed with a centrally-located exhaust port, valve means for controlling the flow of fluid pressure from said inlet to said outlet chamber, said valve means being resiliently biased toward closed position, and said outlet chamber communicating with said outlet, resilient means abutting said piston and variably manually compressible to move said piston into contact with said valve means to close off said exhaust port and move said valve means to operative position, said piston being subjected to the fluid pressure in said outlet chamber and being moved thereby against the tension of said resilient means to permit closing of said valve means when the pressure of the fluid in the outlet chamber bears a predetermined relation to the compression of the resilient means, and means formed in said casing for by-passing fluid around said valve means from the outlet chamber to the inlet, when the pressure of the fluid in the inlet is reduced.

6. In a fluid pressure braking system having front and rear brake actuators, a reservoir of fluid pressure, a brake valve, a connection between said valve and said front brake actuators, a connection between said valve and said rear brake actuators, said valve being operable to simultaneously establish communication between said reservoir and said connections, a valve device in said first named connection for limiting the pressure of the fluid conducted to and from said front brake actuators through said valve device, said valve device including means including an inlet and exhaust valve for maintaining the pressure in the front brake actuators at the limited valve, and by-pass means for conducting fluid pressure from said front brake actuators to said brake valve independently of said valve device when said brake valve is moved to release position.

7. In a fluid braking system for a vehicle including a pair of front brake members, a pair of rear brake members, a pipe connecting the front brake members together, a second pipe connecting the rear brake members together, a single pressure producing means, a pipe connecting said pressure producing means with said rear connecting pipe, a pipe connecting said pressure producing means with said front pipe and a pressure limiting means in said latter pipe, said pressure limiting means comprising a housing, a normally open valve in said housing, means carried by the housing and operable under a predetermined pressure of fluid within the housing to cut off the flow f fluid therethrough to thereby provide a differential pressure for the front and rear brake members, and means operable at will by the operator of the vehicle to tension said lattter means.

STEPHEN VORECH.